United States Patent [19]
Langford

[11] 4,077,636
[45] Mar. 7, 1978

[54] SELF-ALIGNING CABLE ROD SEAL

[75] Inventor: William D. Langford, Stow, Ohio

[73] Assignee: Incom International, Inc., Pittsburgh, Pa.

[21] Appl. No.: 788,527

[22] Filed: Apr. 18, 1977

[51] Int. Cl.² ............... F16C 1/28; B65D 53/02
[52] U.S. Cl. ............... 277/117; 277/151; 277/157; 277/186; 277/207 R; 74/501 R; 403/366
[58] Field of Search ............... 74/501 R, 502, 501.5, 74/503; 403/366, 372; 277/31, 84, 117, 138, 149, 151, 152, 157, 165, 166, 186, 189, 207 R, 207 A, DIG. 2

[56] References Cited
U.S. PATENT DOCUMENTS

| | | | |
|---|---|---|---|
| 2,529,486 | 11/1950 | Clarkson et al. | 74/501 X |
| 2,751,793 | 6/1956 | Sandberg | 74/502 |
| 2,850,915 | 9/1958 | Bratz | 74/501 |
| 3,426,613 | 2/1969 | Conrad | 403/372 X |
| 3,740,083 | 6/1973 | Zenhausern | 403/372 X |
| 3,752,008 | 8/1973 | Danek | 74/501 R |
| 3,857,589 | 12/1974 | Oostenbrink | 277/DIG. 2 X |

FOREIGN PATENT DOCUMENTS

| | | | |
|---|---|---|---|
| 1,011,617 | 4/1952 | France | 74/501 |
| 1,226,907 | 2/1960 | France | 277/117 |
| 595,030 | 6/1959 | Italy | 74/501 |
| 905,487 | 9/1962 | United Kingdom | 74/501 |

*Primary Examiner*—Robert S. Ward, Jr.
*Attorney, Agent, or Firm*—James C. Wray

[57] ABSTRACT

A self-aligning, wear-resistant seal assembly is provided for a cable rod slidably positioned within a cable conduit. A rigid nylon ring which fits snugly around the rod is held against the end of the conduit by an elastomeric seal. The seal has an end wall which overlies the ring and has an axial bore aligned with the ring adapted for interference fit around the rod. Corresponding serrations on the conduit and seal cooperate to embracingly secure the seal to the rod.

10 Claims, 2 Drawing Figures

SELF-ALIGNING CABLE ROD SEAL

BACKGROUND OF THE INVENTION

This invention relates generally to cable rod seals, and more particularly has reference to a self-aligning, wear resistant cable rod seal having a sealing lip which is not distorted by side loads on the cable rod.

DESCRIPTION OF THE PRIOR ART

Pertinent United States and foreign patents are found in Class 74, Subclasses 469, 490, 491, 501 R, 501 T, 502, 503 and 504 and in Class 277, Subclasses 138, 152, 165, 180, 188, 212 R, 212C, 212 F, 212 FD and 227 of the official classifications in the United States Patent and Trademark Office.

Examples of pertinent patents are U.S. Pat. Nos. 2,701,172; 2,859,993; 3,139,768; 3,164,389; 3,228,384; 3,380,318; 3,429,197; 3,443,452; 3,443,845; 3,647,230; 3,719,366; 3,822,068.

The sealing washer of U.S. Pat. No. 3,380,318 provides the seal rather than moving a sealing lip.

The cast iron collar of U.S. Pat. No. 2,859,993 has a structure and a function which are not similar to the present invention.

The disk like members in U.S. Pat. No. 3,228,384 are the only seals in the cup. They have neither the function nor the structure of the present invention.

The annular sealing member in U.S. Pat. No. 3,164,381 is the primary seal. The structure and function of the annular member do not suggest the structure and function of the nylon ring in the present invention.

U.S. Pat. No. 3,443,452 shows a disk like plate mounted in the recess at the end of a conduit for a sliding rod at the end of a flexible control cable. Again, the function of that disk is not similar to the function of the ring in the present invention, nor is the structure similar.

In U.S. Pat. No. 3,443,845, the disk like element is the primary seal.

U.S. Pat. Nos. 2,701,172 and 3,647,230 have backing elements which aid in seals, but their structure and function do not suggest the present invention.

Many problems remain in the prior art devices. One problem lies in distortions of the sealing lip when side loads are applied to the cable rod. Another problem lies in the rapid deterioration of sealing assemblies caused by frictional contact between the sliding rod and the soft resilient materials required to adequately perform the sealing function.

SUMMARY OF THE INVENTION

The present invention overcomes many of the problems which exist in the prior art devices. The seal assembly of the present invention uses a conventional cup seal for a sliding rod. A molded plastic ring is placed on the rod before the cup seal is slid over the rod. The ring causes the sealing opening of the cup to move radially with minor movements of the rod and prevents side loads on the rod from distorting the seal lip.

OBJECTS OF THE INVENTION

Objects of the invention are, therefore, to provide an improved cable rod seal which prevents side loads on the rod from distorting the seal lip and which causes the sealing opening of the cup seal to move radially with minor movements of the rod.

Another object is to provide a cable rod seal which is highly wear resistant.

A further object of the invention is the provision of a self-aligning cable rod seal adapted to be mounted on a cable conduit having a cable slidably positioned therein comprising a relatively rigid ring bearing adapted for close contact with the rod disposed therein, and a resilient seal having an end wall overlying said ring and axially restrained to prevent axial movement or the ring, said rod having an axial bore aligned with the ring and adapted for close contact with the rod disposed therein.

Yet another object of the invention is to provide an end wall overlying the ring which holds the ring against the end portion of the conduit.

Another object of the invention is to provide an axial bore adapted for an interference fit around the rod disposed therein.

Still another object of the invention is to provide a resilient seal which embraces the end portion of the conduit.

A yet further object of the invention is to provide a seal formed of an elastomeric material in combination with a ring formed of a molded plastic material.

Another object of the invention is to provide a resilient seal with a side wall having serrations adapted to cooperate with corresponding serrations on the end portion of the conduit for securing the seal to the conduit.

These and other end further objects and features of the invention are apparent in the disclosure which includes the above and below specifications and claims and drawings.

DETAILED DESCRIPTION OF THE DRAWINGS

Figure 1:
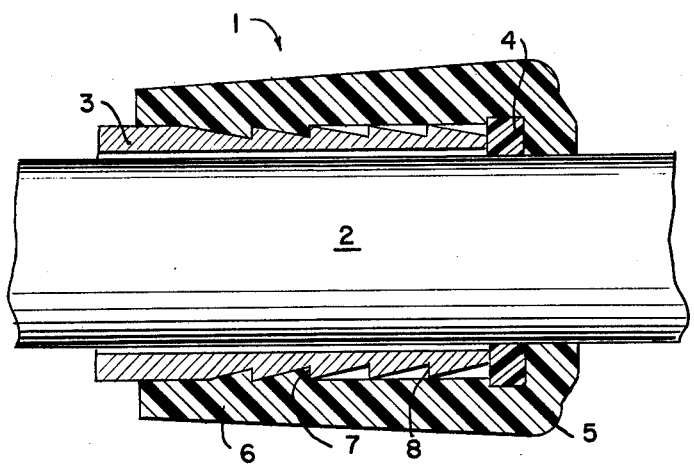
FIG. 1 is an enlarged sectional view of the seal assembly of the present invention shown mounted on a cable rod and conduit.
Figure 2:
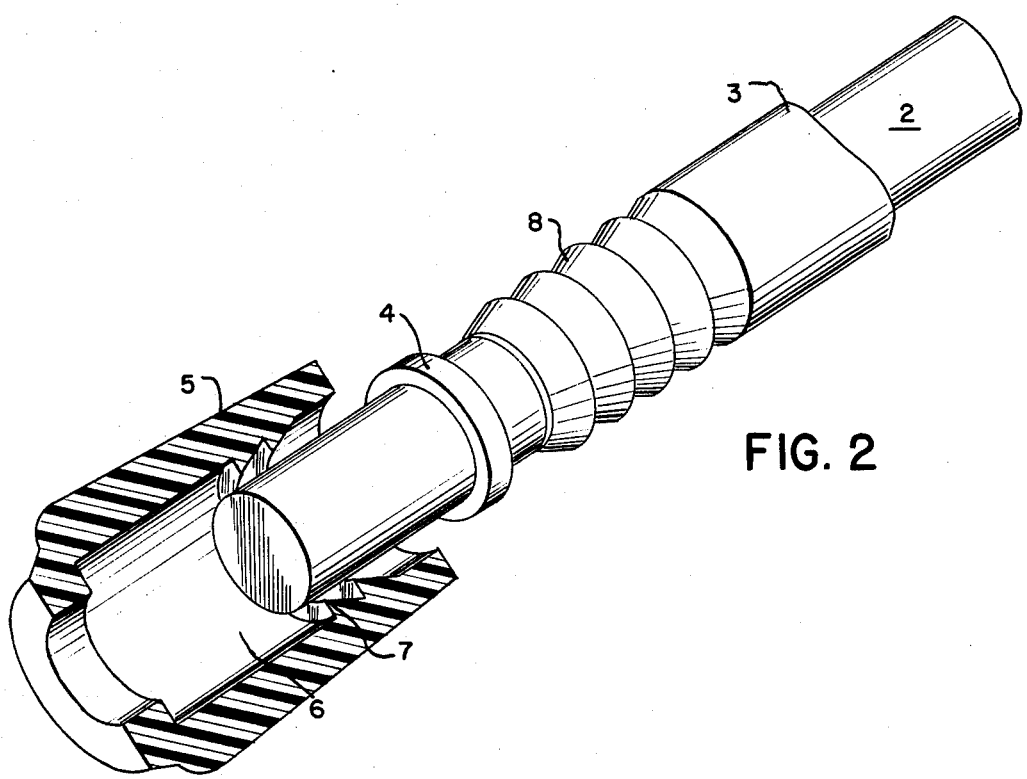
FIG. 2 is an exploded view, partly in section, showing the elements of the seal assembly of the present invention in association with a cable rod and conduit.

Referring to FIG. 1, a self-aligning cable rod seal assembly 1, embodying the features of the present invention, is shown mounted on a cable rod 2 and conduit 3. The rod 2 is a relatively long rigid member which is customarily crimped to the end of a flexible cable and used to communicate axial actuating forces to the cable. The rod 2 is slidably mounted in a rigid tubular conduit 3 which is customarily connected to the end of a flexible cable guide.

The seal assembly 1 generally comprises a ring bearing 4 and a seal member 5. The seal is provided with an axially extending side wall 6 which embraces the end portion of the conduit 3. Serrations 7 on the inner surface of the side wall 6 are adapted to cooperate with corresponding serrations 8 on the conduit 3 to secure the seal member 5 to the conduit 3. The end portion of the seal 5 which overlies the ring bearing 4 restrains the ring 4 against axial movement and holds the ring 4 securely against the end portion of the conduit 3.

The bearing 4 is formed of a highly wear resistant material capable of being formed into a rigid ring. In particular, nylon has been found to work exceptionally well due to its highly wear resistant characteristics. The seal 5, on the other hand, is formed of a relatively soft elastomeric material. Such material possesses the high elastic memory required to effectively perform the sealing function.

Both the ring bearing 4 and the portion of the seal member 5 overlying the ring 4 fit snugly around the rod 2. This close contact between the seal member 5 and the rod 2 effectively prevents entry of destructive material into the conduit 3 but at the same time permits the rod 2 to slide freely in the conduit 3. Side loads on the rod 2 are communicated primarily to the ring 4. The ring 4 is sufficiently rigid to absorb these loads and cause the opening in the sealing member 5 to move radially. The sealing member 5 thus remains in close contact with the rod 2 at all points around the circumference of the rod 2 despite radial movement of the rod 2. Since radial distortion of the sealing surface of the sealing member 5 in the present invention is virtually eliminated, the seal member 5 can be formed of very soft materials possessing improved sealing properties.

As the rod 2 slides axially in the conduit 3 friction between seal assembly 1 and rod 2 results. Since the ring member 4 of the sealing assembly 1 in the present invention fits snugly around the sliding rod 2 a substantial portion of the frictional forces are absorbed by the ring 4. Excessive wear of the soft seal member 5 is eliminated.

In an alternative embodiment of the present invention, the seal member 5 is adapted for an interference fit around the rod 2. With this arrangement, the sealing function of the seal assembly 1 is performed more effectively. The ring 4 prevents excessive distortion of the seal 5 as the rod 2 slides past the seal assembly 1.

While the invention has been described with reference to a specific embodiment, the exact nature and scope of the invention is defined in the following claims.

What is claimed is:
1. A self-aligning cable rod seal adapted to be mounted on a cable conduit having a cable rod slidably positioned therein comprising a relatively rigid ring bearing adapted for close contact with the rod disposed therein, and a resilient seal having an end wall axially overlying said ring bearing and axially restrained to prevent axial movement of the ring bearing, said wall having an axial bore aligned with the ring bearing and adapted for close contact with the rod disposed therein.
2. The apparatus of claim 1 wherein the end wall overlying the ring bearing is adapted to urge the ring bearing toward the end portion of the conduit.
3. The apparatus of claim 1 wherein the axial bore is adapted for an interference fit around the rod disposed therein.
4. The apparatus of claim 1 wherein the resilient seal is adapted to embrace the end portion of the conduit.
5. The apparatus of claim 1 wherein the ring bearing is formed of a molded plastic material.
6. The apparatus of claim 1 wherein the seal is formed of an elastomeric material.
7. The apparatus of claim 1 wherein the seal is formed of an elastomeric material and the ring bearing is formed of a molded plastic material.
8. The apparatus of claim 4 wherein the resilient seal is provided with a side wall having serrations adapted to cooperate with corresponding serrations on the end portion of the conduit for securing the seal to the conduit.
9. The apparatus of claim 5 wherein the ring bearing is formed of nylon.
10. The apparatus of claim 7 wherein the ring bearing is formed of nylon.

* * * * *